United States Patent
Karamchedu et al.

(10) Patent No.: US 8,145,716 B2
(45) Date of Patent: *Mar. 27, 2012

(54) METHOD AND APPARATUS FOR ASSIGNING COST METRICS TO ELECTRONIC MESSAGES

(75) Inventors: Murali M. Karamchedu, Beaverton, OR (US); Jeffrey B. Sponaugle, Hillsboro, OR (US)

(73) Assignee: Kryptiq Corporation, Hillsboro, OR (US)

( * ) Notice: Subject to any disclaimer, the term of this patent is extended or adjusted under 35 U.S.C. 154(b) by 758 days.

This patent is subject to a terminal disclaimer.

(21) Appl. No.: 11/221,591

(22) Filed: Sep. 7, 2005

(65) Prior Publication Data

US 2006/0092920 A1    May 4, 2006

Related U.S. Application Data

(63) Continuation-in-part of application No. 10/635,184, filed on Aug. 6, 2003.

(60) Provisional application No. 60/401,942, filed on Aug. 7, 2002.

(51) Int. Cl.
*G06F 15/16* (2006.01)
(52) U.S. Cl. .......... 709/206; 709/203
(58) Field of Classification Search .......... 709/203–206
See application file for complete search history.

(56) References Cited

U.S. PATENT DOCUMENTS

| | | |
|---|---|---|
| 5,832,496 A | 11/1998 | Anand et al. |
| 5,862,325 A | 1/1999 | Reed et al. |
| 6,151,624 A | 11/2000 | Teare et al. |
| 6,199,081 B1 * | 3/2001 | Meyerzon et al. ............ 715/210 |
| 6,311,194 B1 | 10/2001 | Sheth et al. |
| 6,331,867 B1 | 12/2001 | Eberhard et al. |
| 6,389,403 B1 | 5/2002 | Dorak |
| 7,028,075 B2 | 4/2006 | Morris |
| 7,046,261 B2 | 5/2006 | Popp et al. |
| 7,114,126 B2 | 9/2006 | Berger et al. |
| 7,209,922 B2 | 4/2007 | Maze et al. |
| 7,225,249 B1 | 5/2007 | Barry et al. |
| 2003/0212818 A1 * | 11/2003 | Klein et al. .................. 709/238 |
| 2004/0039786 A1 * | 2/2004 | Horvitz et al. ............... 709/207 |
| 2004/0186776 A1 * | 9/2004 | Llach ............................. 705/14 |
| 2010/0088115 A1 * | 4/2010 | Henley ............................ 705/3 |

OTHER PUBLICATIONS

International Search Report for Application No. PCT/US03/24424, mailed on Dec. 3, 2003.
Examiner's Report for CA Application No. 2494936, mailed May 3, 2011.

* cited by examiner

*Primary Examiner* — Ian N Moore
*Assistant Examiner* — Afshawn Towfighi
(74) *Attorney, Agent, or Firm* — Schwabe, Williamson & Wyatt, P.C.

(57) ABSTRACT

The present invention provides methods and apparatuses for contextualization of electronic messages, for example, by determining at least one cost metric for an electronic mail message based at least in part upon an identified context, automatically generating metadata representing the at least one cost metric, and associating the metadata with the electronic mail message.

27 Claims, 12 Drawing Sheets

600b

<HEADERS>

<DATE> 29 May 2003 </DATE>

<FROM> NurseP@hospital.com </FROM>

<TO> DoctorFeelgood@hospital.com </TO>

<MESSAGE-ID> 12345@hospital.com <MESSAGE-ID>

</HEADERS>

<BODY>

<CARE EPISODE 1><PATIENT> Bob Jones </PATIENT> was examined today. His chief complaint was <CHIEF COMPLAINT SYMPTOM1=nausea✓615 SYMPTOM2=vomiting✓618> fever✓616 </CHIEF COMPLAINT>, but he also suffered from nausea and vomiting. Diagnosis was <DIAGNOSIS> influenza </DIAGNOSIS>. No medication prescribed. </CARE EPISODE 1>

</BODY>

Figure 6b

METHOD AND APPARATUS FOR ASSIGNING COST METRICS TO ELECTRONIC MESSAGES

RELATED APPLICATIONS

This non-provisional patent application is a continuation-in-part application of and claims priority to U.S. patent application Ser. No. 10/635,184 entitled "Method and Apparatus for Semantic Qualification and Contextualization of Electronic Messages" filed on Aug. 6, 2003, which in turn claims priority to U.S. Provisional Patent Application No. 60/401,942, entitled "Decision Support Tool for Reconciling Domain Specific Complex Data and Summary Delivery", filed on Aug. 7, 2002. The entire contents and disclosures of the above-applications are hereby incorporated by reference.

BACKGROUND OF THE INVENTION

With advances in integrated circuit, microprocessor, networking and communication technologies, an increasing number of devices, in particular, digital computing devices, are being interconnected. This increased interconnectivity of computing devices has laid the groundwork for a communication infrastructure particularly well suited for electronic communications between such computing devices. More specifically, the increased interconnectivity of computing devices coupled with the ease of use and immediacy afforded by electronic messaging has led to the widespread adoption of electronic messaging applications such as email.

In the past, electronic messaging was limited to the exchange of text-based email messages between a relatively small populace. Over time, however, electronic messaging applications and associated communications protocols have grown increasingly sophisticated enabling complex message formatting as well as the ability to distribute binary data with the messages to large numbers of recipients. Despite such advancements, however, email continues to be used merely as a means of communication between two or more end users.

BRIEF DESCRIPTION OF DRAWINGS

The present invention will be described by way of exemplary embodiments, but not limitations, illustrated in the accompanying drawings in which like references denote similar elements, and in which:

FIGS. 6a-6b illustrate sample code generated by semantic qualification logic 108 in accordance with various embodiments of the invention, to represent various semantic associations involved with the episode of care described in FIGS. 4a-4c and 5;

DETAILED DESCRIPTION OF EMBODIMENTS OF THE INVENTION

Figure 1:
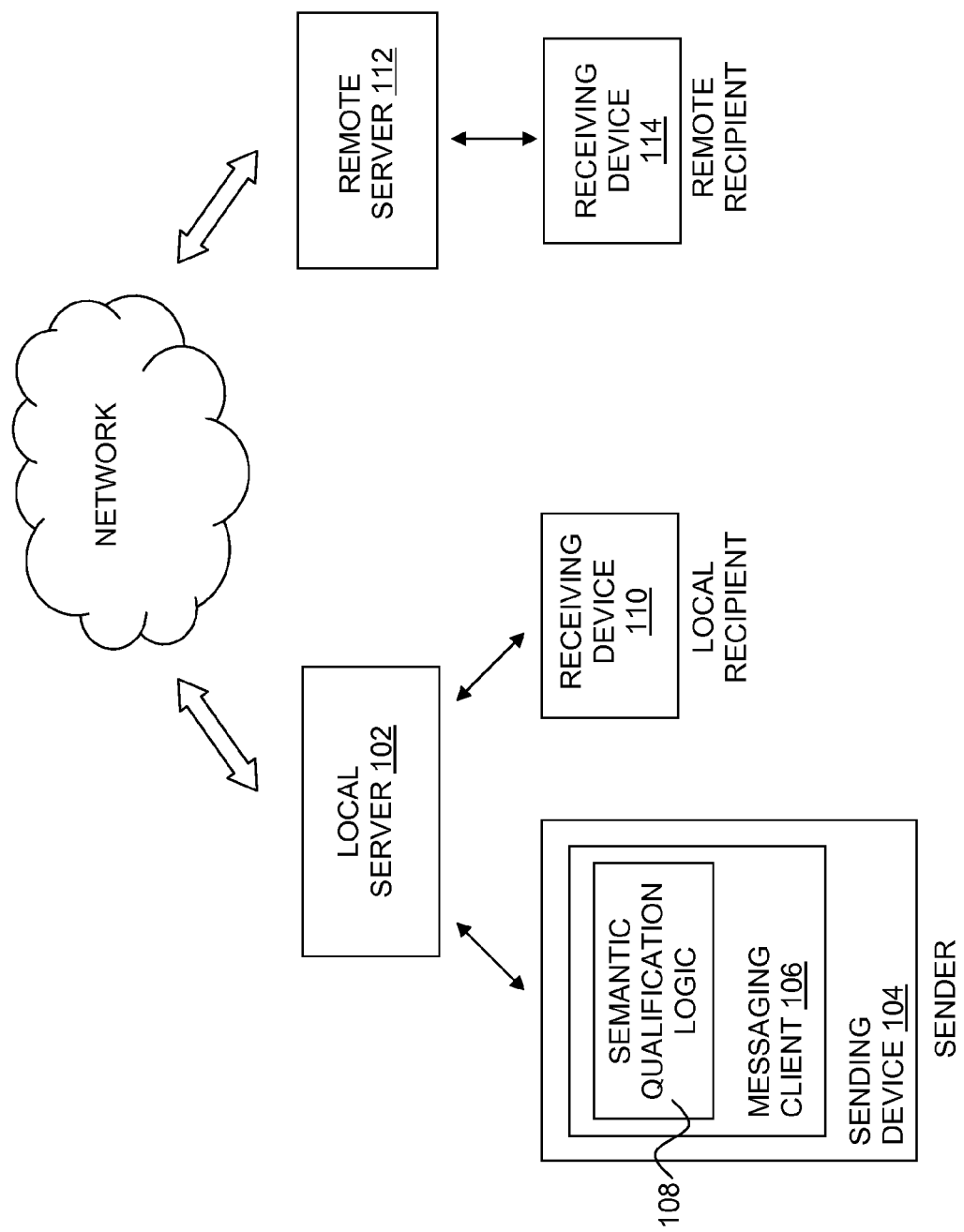
FIG. 1 illustrates an example network environment including an email client endowed with semantic qualification logic in accordance with one embodiment of the invention.

In the following detailed description, numerous specific details are set forth in order to provide a thorough understanding of the embodiments of the present invention. However, those skilled in the art will understand that the present invention may be practiced without these specific details, that the present invention is not limited to the depicted embodiments, and that the present invention may be practiced in a variety of alternative embodiments. In other instances, well known methods, procedures, components, and circuits have not been described in detail.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful for understanding the embodiments of the present invention. However, the order of description should not be construed as to imply that these operations are necessarily performed in the order they are presented, nor even order dependent. Lastly, repeated usage of the phrase "in one embodiment" does not necessarily refer to the same embodiment, although it may.

The description repeatedly uses the phrase "in one embodiment", which ordinarily does not refer to the same embodiment, although it may. Furthermore, the terms "comprising", "including", "having", and the like, as used in the present application, are synonymous.

In various embodiments of the invention, a method and apparatus for contextualizing electronic messages is provided. The terms "contextualizing" and "contextualization" as used herein are intended to broadly refer to the act of conveying meaning, whether the meaning be literal, figurative, arbitrary or connotative. Furthermore, in the following description including the claims, unless further particularized or otherwise noted, the terms "message" and "electronic message" are each intended to refer to a broad class of electronic message types including but not limited to electronic mail messages, instant messages, attachments and/or data files (in whole or in part), whether or not they comprise a text, binary, or otherwise encoded form, and whether or not they are transmitted via the Simple Mail Transport Protocol (SMTP), Instant Messaging and Presence Protocol (IMPP), HTTP, file transfer protocol (FTP), trivial file transfer protocol (TFTP), or otherwise.

In one embodiment, electronic messages are enriched with semantic qualifiers to provide contextualization of the messages as well as to facilitate semantic based searching, and post-processing of the electronic messages. In one embodiment of the invention, a given electronic message and/or its constituent content elements may be contextualized through the provision of one or more semantic qualifiers to convey a single meaning or compound meanings. Similarly, a given semantic qualifier may be repeated within a single message or repeated throughout multiple messages to facilitate grouping or categorization of content elements. The semantic qualifiers may be automatically associated (i.e. without further user input) with one or more content elements based upon e.g. one or more identified contexts, or the semantic qualifiers may be manually associated with one or more content elements through e.g. user input. A content element may represent one or more text elements such as characters, words, phrases, paragraphs, or other portions of the electronic message, and may correspond to one or more languages and/or character sets.

FIG. 1 illustrates an example network environment including a messaging client endowed with semantic qualification logic in accordance with one embodiment of the invention. In the illustrated embodiment, sending device 104 is equipped with messaging client 106 to send and receive electronic messages to/from local and remote recipients. In one embodiment, local server 102 and remote server 112 may each represent a mail server. Accordingly, messaging client 106 may send an email message to a local recipient via local server 102 and receiving device 110. Likewise, and messaging client 106 may send an email message to a remote recipient via local server 102, remote server 112 and receiving device 114. In one embodiment, local server 102 may temporarily store email messages and forward the messages to designated recipients on behalf of sending device 104. In other embodiments, local server 102 may represent an HTTP server to route incoming and outgoing communication requests to and from sending device 104.

In one embodiment, messaging client 106 is equipped with semantic qualification logic 108 to facilitate contextualization of electronic messages in accordance with teachings of the present invention. In one embodiment, contextualization is achieved through the addition of one or more semantic qualifiers, where a qualifier may take a variety of forms such as, but not limited to one or more characters, symbols, words or tags. The semantic qualifiers may be associated with the elements they qualify in a number of manners. For example the semantic qualifiers may be included within any part of an electronic message, such as in the header or body sections of an email message, or the semantic qualifiers may be external to the electronic message they act to contextualize. In one embodiment, a subset of content elements from the electronic message may be stored within a secondary message in association with one or more semantic qualifiers. The associations between the content element(s) and semantic qualifier(s) may be stored in the form of a lookup table, an indexed list, as well as other formalized or ad hoc data relationships.

In one embodiment the semantic qualifiers may represent metadata tag pairs that are embedded within electronic messages. In another embodiment the semantic qualifiers may represent obfuscated tokens embedded within electronic messages. The semantic qualifiers may be associated with the messages and/or elements they qualify based upon their positions relative to the messages/elements that they qualify. For example, semantic qualifiers may precede the element(s) that they are intended to qualify (e.g. in the form of a prefix), may follow the element(s) that they are intended to qualify (e.g. in the form of a suffix), or may both precede and follow the element(s) they are intended to qualify in the event more than one qualifier is utilized.

Manual Qualifier Generation

In accordance with one embodiment of the invention, semantic qualification logic 108 includes facilities for a user to perform manual semantic highlighting on electronic messages such as, but not limited to email messages. In one embodiment, a user manually identifies at least a portion of an electronic message to be semantically highlighted. The user may do so by manually marking portions of the electronic message (or the electronic message in its entirety) via a graphical user input device such as a mouse, trackball, stylus, pen or equivalent, or through text or macro-based input via one or more keystrokes of a keyboard. Furthermore, the user may perform such marking on a pre-existing electronic message or during the composition of a new electronic message.

In addition to a user identifying at least a portion of an electronic message to be semantically highlighted, the user may also identify one or more semantic qualifiers to be associated with the identified portion(s) of the electronic message. In one embodiment, the user may identify one or more semantic qualifiers from a selection of semantic qualifiers presented to the user. In another embodiment, the user may directly specify the semantic qualifiers to be used. For example, the user may be presented with facilities such as a graphical dialog box through which the user may provide a text-based token to be utilized as the semantic qualifier.

In one embodiment, once one or more semantic qualifiers have been identified, they are associated with the appropriate identified portion(s) of the electronic message. In one embodiment of the invention, the semantic qualifiers are represented as metadata tag pairs that are embedded within the body of the email message and positioned so as to surround the associated portion of the email message. In one embodiment, an extensible markup language (XML) based data structure representing the contextualized email message including semantic qualification associations is generated.

Figure 2:
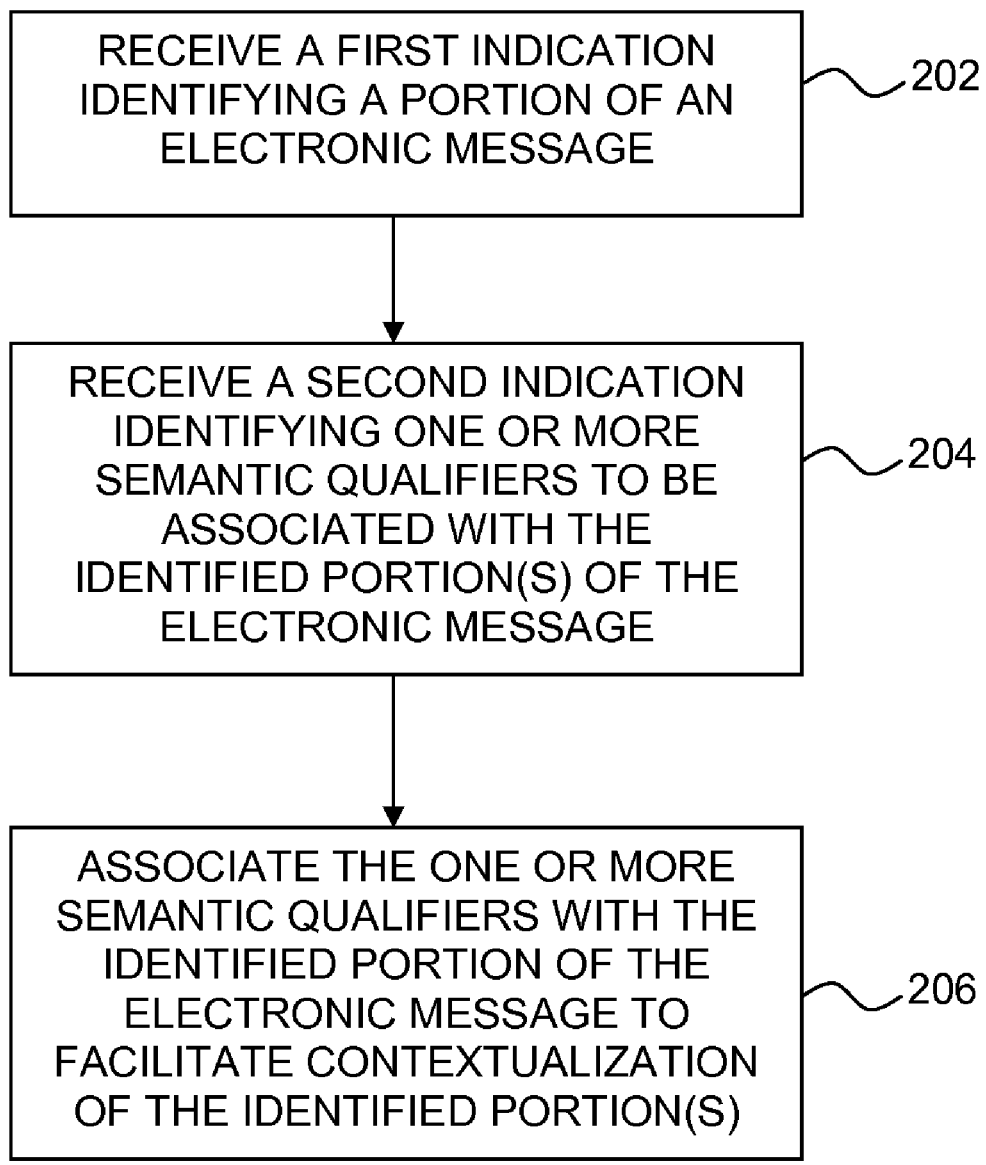
FIG. 2 is an operational flow diagram illustrating a process flow for manual generation of semantic qualifiers, in accordance with one embodiment of the invention.

FIG. 2 is an operational flow diagram illustrating a process flow for manual generation of semantic qualifiers, in accordance with one embodiment of the invention. In the illustrated embodiment, the process begins at block 202 with semantic qualification logic 108 receiving a first indication from a user identifying a portion or portions of an electronic message to be qualified. At block 204, a second indication is received from the user identifying one or more semantic qualifiers to be associated with the identified portion(s) of the electronic message. Lastly, at block 206, semantic qualification logic 108 associates the one or more semantic qualifiers identified by the user with the identified portion(s) of the electronic message to facilitate the contextualization of either the identified portion(s) of the electronic message or the electronic message in its entirety.

Figure 3:
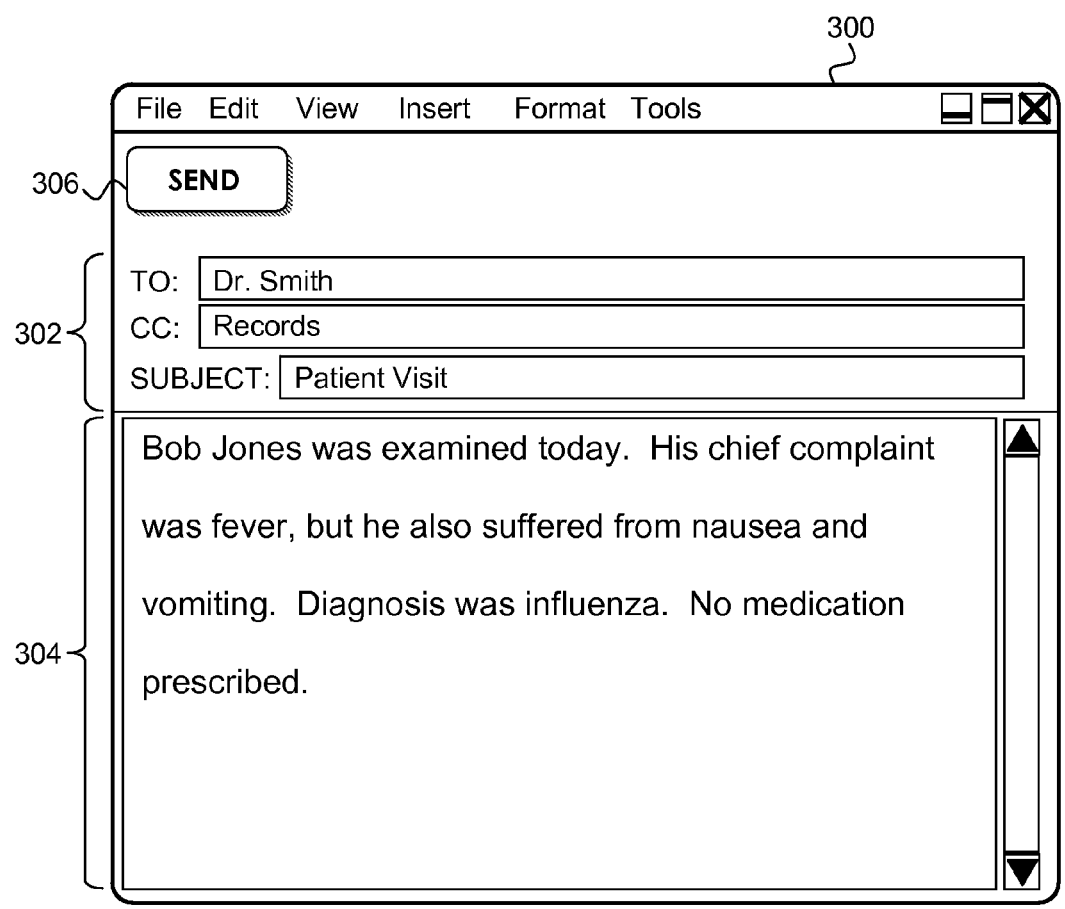
FIG. 3 is a graphical representation of an email message composition interface suitable for use in practicing the present invention.

FIG. 3 is a graphical representation of an electronic message composition interface suitable for practicing the present invention in accordance with one embodiment. More specifically, FIG. 3 illustrates an email message composition interface (email interface 300) for generating electronic mail messages in accordance with one embodiment of the invention. In one embodiment, email interface 300 may be generated by messaging client 106 in response to a user electing to send an email message to one or more recipients. As shown, email interface 300 includes a displayed email message containing a message body section 304 and a message header section 302. Message body section 304 contains email message content elements to be contextualized, while message header section 302 is used to provide message transport information for routing the message. Although message header section 302 may contain a subject field for a user to provide information about the message, the subject information is used to describe to other users what the message relates to as a whole. In contrast, the semantic qualifiers of the present invention may facilitate the generation of one or more semantic associations with arbitrarily identifiable portions of the message content.

In one embodiment of the invention, portions of messages containing semantic associations may be aggregated based upon one or more rules or aggregation policies. In one embodiment, portions of messages containing semantic associations are identified and aggregated as the messages are transmitted by the sender via e.g. selection of the send button 306. Moreover, in one embodiment, the aggregated content can be searched to identify one or more previously generated semantic associations. In one embodiment, the search results may be aggregated to form one or more secondary electronic messages whether it is an email message, a text document, and so forth.

Figure 4A:
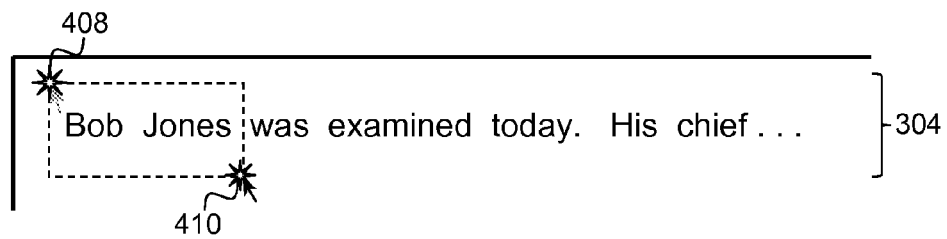
FIGS. 4a-4c depict various embodiments in which portions of an electronic mail message may be identified for semantic association and contextualization based upon an episode of care.
Figure 4B:
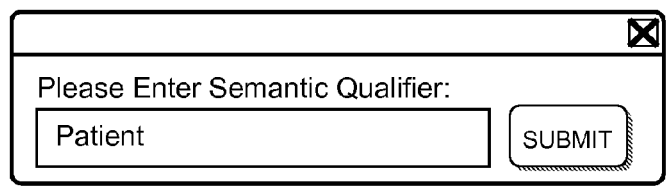
Figure 4C:
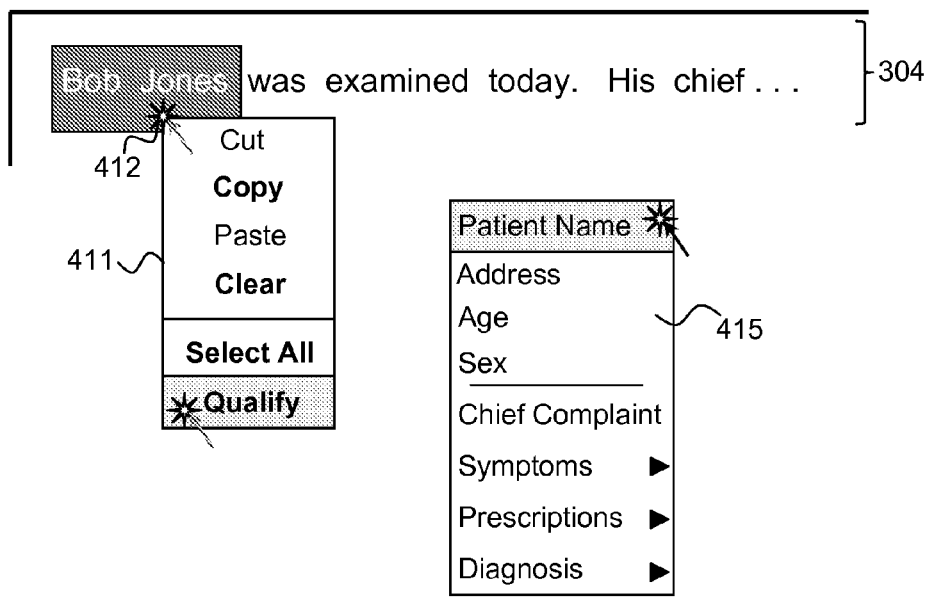

FIGS. 4a-4c illustrate a semantic association and contextualization process as it may apply to an electronic mail message related to an episode of care, in accordance with various embodiments of the invention. FIG. 4a illustrates one method by which a portion of the electronic mail message of FIG. 3 may be identified for semantic highlighting, in accordance with one embodiment. As shown, a user may utilize an input device such as a mouse to graphically select one or more portions of message body section 304 of an electronic mail message. For example, a user may position a mouse pointer on a display screen at location 408, click a mouse button, drag the mouse pointer to position 410, and release the mouse button to effectively identify the text element(s) "Bob Jones". In other embodiments, the user may utilize other indication techniques such as using one or more keystrokes or keystroke combinations, voice-based input techniques, and so forth. In response to the user identifying the one or more text elements, semantic qualification logic 108 may display one or more graphical input facilities for the user to manually provide/indicate one or more semantic qualifiers to be associated with the identified portion of the electronic mail message as shown in FIG. 4b.

FIG. 4b illustrates one embodiment of an interface for identifying one or more semantic qualifiers to be associated with an identified portion of an electronic mail message. In the illustrated example, the semantic qualifier "Patient" may be submitted to semantic qualification logic 108 through e.g. a hypertext transmission protocol (HTTP) POST operation, where it is then associated with the text element "Bob Jones" identified in FIG. 4a.

FIG. 4c illustrates an alternative embodiment of an interface for identifying one or more semantic qualifiers to be associated with an identified portion of an electronic mail message. As shown in FIG. 4c, a user can use an alternative input mechanism such as a 'right click' of a mouse button to cause a context-sensitive list of options to be displayed to the user. For example, semantic qualification logic 108 may cause the display of context menu 411 in response to a user selecting the text element "Bob Jones" and then 'right clicking' on the highlighted selection (e.g. at position 412). In one embodiment, menu 411 includes a menu option (e.g. "Qualify") that when selected, indicates to semantic qualification logic 108 that the user wishes to generate a semantic association between the highlighted text element and one or more semantic qualifiers. In response, semantic qualification logic 108 may display a list of semantic qualifiers (e.g. such as qualifier list 415) to facilitate user identification of the semantic qualifiers to be associated with the highlighted text element. In the illustrated example, the semantic qualifier "Patient Name" is associated with the name "Bob Jones" based upon received user input. In one embodiment, the "Patient Name" qualifier is generated in the form of a metadata tag that is embedded within body section 304 in association with the content element "Bob Jones".

Figure 5:
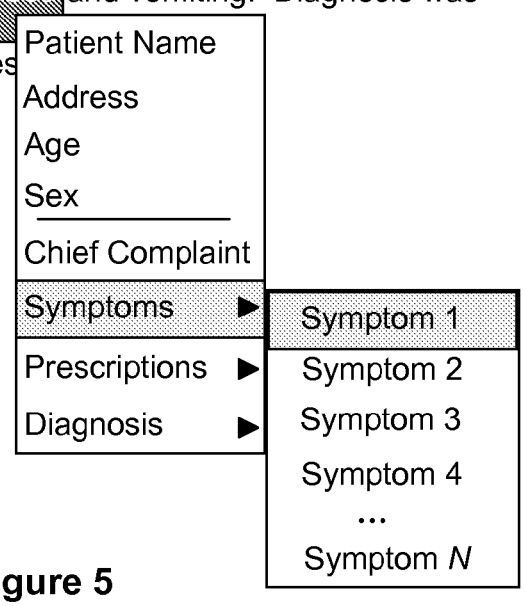
FIG. 5 illustrates further facilities for identifying one or more semantic qualifiers to be associated with an identified portion of an electronic mail message, in accordance with one embodiment of the invention.

FIG. 5 illustrates further facilities for identifying one or more semantic qualifiers to be associated with an identified portion of an electronic mail message, in accordance with one embodiment of the invention. In FIG. 5, for example a user is in the process of choosing to contextualize the text element "nausea" as being a first symptom identified during the episode of care, and to contextualize the text element "vomiting" as being a second symptom identified during the same episode of care.

Figure 6A:
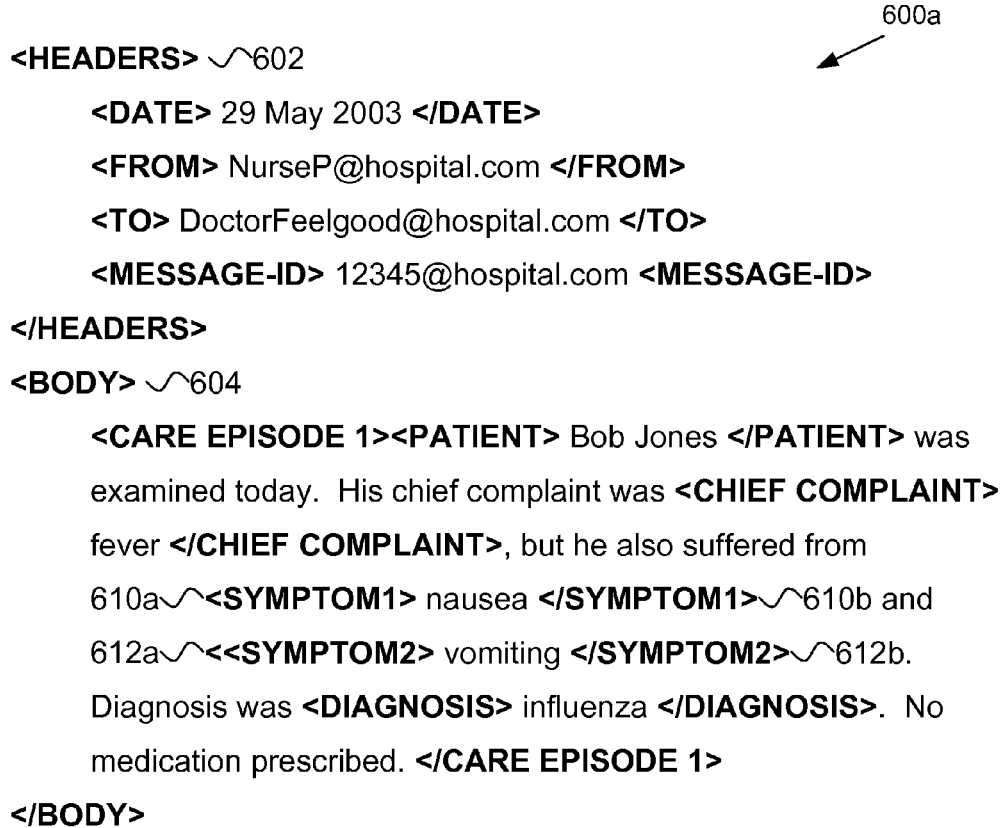

FIGS. 6a-6b illustrate example code that may be generated by semantic qualification logic 108, in accordance with various embodiments of the invention, to represent various semantic associations corresponding to the episode of care described in FIGS. 4 and 5. In the illustrated example of FIG. 6a, an email message representation 600a includes header section 602, containing various demographic information corresponding to the email message, and body section 604 containing the message content. The illustrated email message further contains semantic qualifiers in the form of name/value pairs that are associated with one or more text elements. For example, in FIG. 6a, the term "nausea" is surrounded by a pair of tags named "symptom1" (610a,610b) and the term "vomiting" is surrounded by a pair of tags named "symptom2" (612a,612b). This is intended to indicate that "Bob Jones" has experienced symptoms of nausea and vomiting. FIG. 6b illustrates an alternative method for generating semantic association with email message content. In particular, in the email representation 600b of FIG. 6b the symptoms are associated with the text through the use of attributes. For example, in FIG. 6b, "nausea" 615 is identified as being a first attribute associated with the patient's chief complaint of "fever" 616, and "vomiting" 618 is identified as being a second attribute associated with the patient's chief complaint of fever 616.

Although in the above-described examples, the semantic qualifiers were formed using text elements that also tended to appear within the document, this need not be the case. For example, assume a user was in the process of generating a very important grant proposal for submission via email. The user may wish to indicate via one or more semantic associations that that the grant proposal was in fact a proposal, and that the grant proposal was very important as a potential revenue source. In such a case, the user may indicate (e.g. via name/value pairs) that the email message was an important proposal, notwithstanding that the terms "important" or "proposal" may not appear anywhere in the electronic message. The "importance" of the proposal is a meaning that is attached to the document (or portions of the document) by the user.

Automatic and Semi-Automatic Qualifier Generation

In the example embodiments described above, portions of an electronic mail message containing semantic associations, as well as the semantic qualifiers themselves were user-identified. In one embodiment of the invention, semantic qualifiers are automatically associated with portions of an electronic mail message based at least in part upon an identified context and without further user input.

In one embodiment, a context may define a scope or range from which one or more semantic qualifiers may be identified. A context can be indicated using one or more of a wide variety of data representation techniques including by way of a data dictionary, a schema, and so forth. In one embodiment, the context is manually identified by a user e.g. as part of the email message composition process. In an alternative embodiment, the context is automatically identified by e.g. semantic qualification logic 108 based upon one or more characteristics or traits of the electronic mail message, such as the content of the message body, the subject line of the message, the identity of the sender, the sender's domain, the identity of one or more of the designated recipients, the domain of one or more of the recipients, and so forth. In another embodiment of the invention, the context may be represented by one or more standardized data models such as HL7, the clinical architecture standard (CDA), and so forth. For example, a context corresponding to a "claims processing" email module might provide a different selection of selectable or otherwise identifiable semantic qualifiers than would a context corresponding to a "lab processing" email module.

Figure 7:
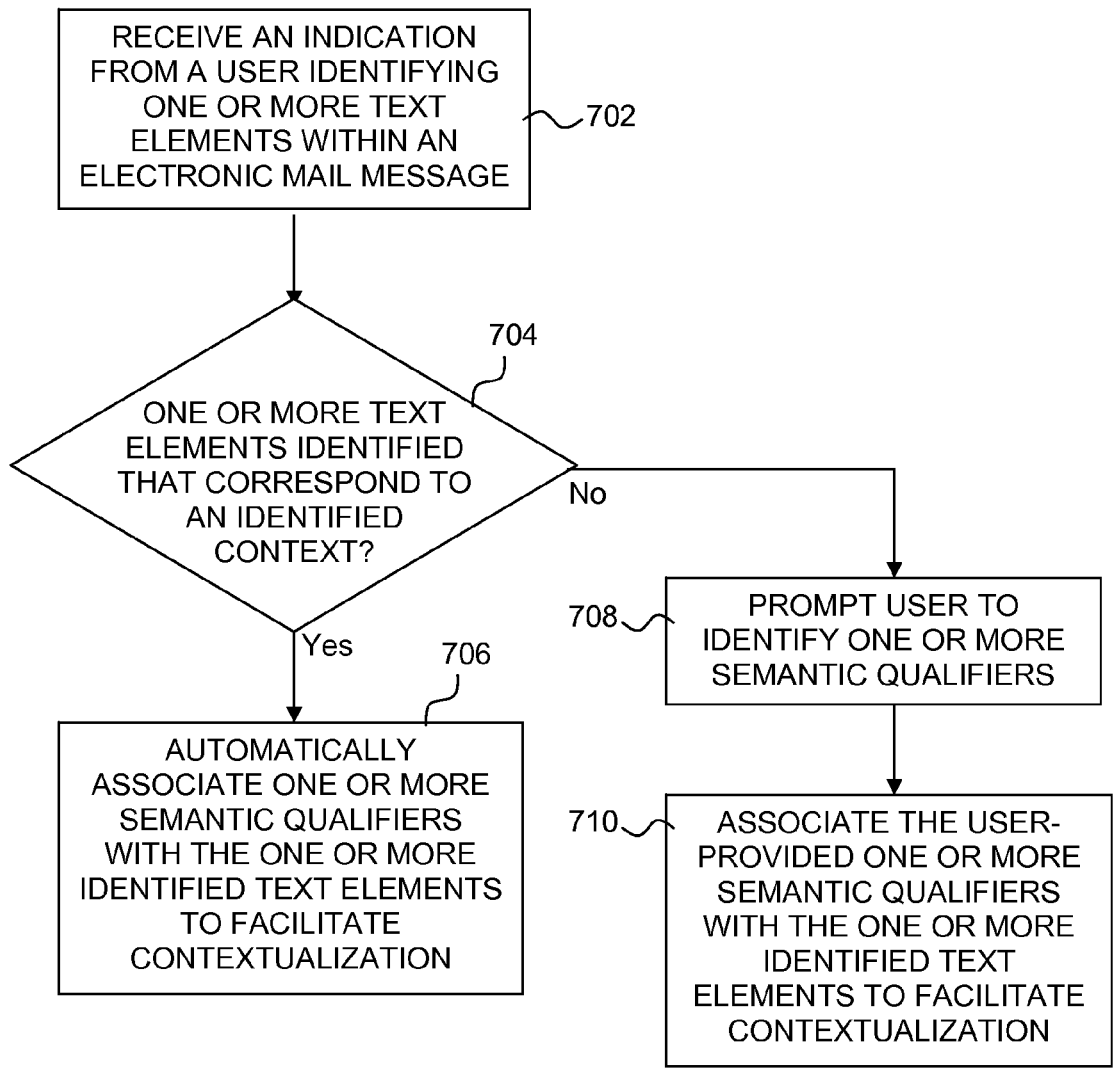
FIG. 7 is an operational flow diagram illustrating context-based contextualization of an email message, in accordance with one embodiment of the invention.

FIG. 7 is an operational flow diagram illustrating a process flow for semi-automatic contextualization of an email message, in accordance with one embodiment of the invention. In the illustrated embodiment, the process begins with semantic qualification logic 108 receiving an indication from a user identifying one or more text elements within an email message, block 702. The user may make such an indication in a number of manners such as those described above. Next, the system may make a determination as to whether the identified element(s) corresponds to an identified context, block 704. In one embodiment, the system may employ one or more lookup or symbol tables to determine whether the identified element(s) are known to exist within the applicable context. If so, semantic qualification logic 108 may automatically associate the identified text element(s) with one or more semantic qualifiers defined by, or corresponding to the identified context, block 706. However, if a determination is made that the identified element(s) does not correspond to the identified context, then the system may prompt the user to identify one or more semantic qualifiers, block 708. Thereafter, the one or more user-provided semantic qualifiers are associated with the one or more identified text elements to facilitate contextualization of the identified text elements or of the email message itself, block 710.

In an alternative embodiment of the invention, upon determining that the identified element(s) corresponds to the identified context, semantic qualification logic 108 may display one or more attributes associated with the one or more identified elements as determined e.g. by the context. For example, in an email message containing the text "chief complaint", semantic qualification logic 108 might automatically identify content element "chief complaint" based upon a medical-related context, and in response may display to the user a list of possible symptoms for further classification/categorization. Thus, in accordance with one embodiment of the invention, semantic qualification logic 108 may automatically identify content elements based upon a given context, and in turn display one or more attributes associated with the identified content elements to the user. Thereafter, semantic qualification logic 108 can automatically generate/provide one or more semantic qualifiers to contextualize the identified content elements based upon user identification of one or more of the displayed attributes.

In yet another embodiment of the invention, semantic qualification logic 108 may operate to automatically identify content elements of a given email message and to automatically contextualize the message or portions of the message based upon semantic associations generated based upon the identified content elements.

Figure 8:
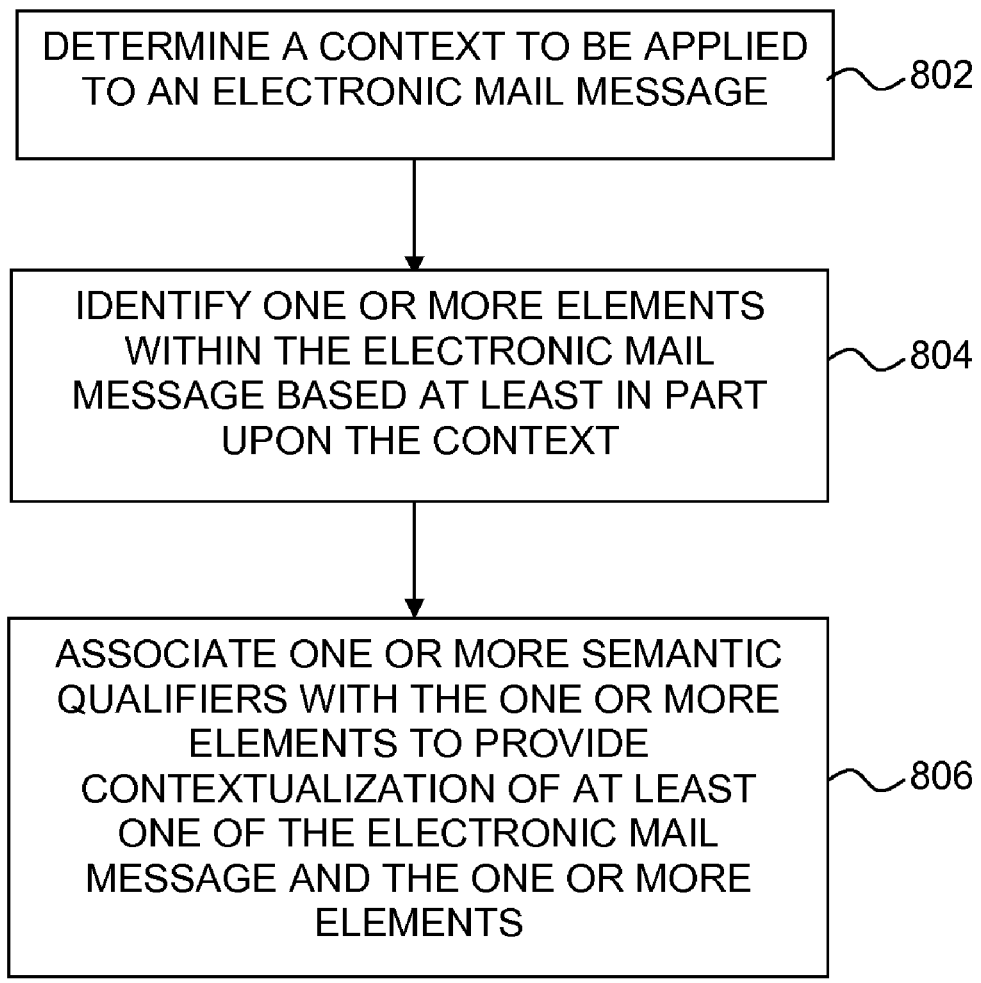
FIG. 8 is an operational flow diagram illustrating an automatic semantic association and contextualization process, in accordance with one embodiment of the present invention.

FIG. 8 is an operational flow diagram illustrating an automatic semantic association and contextualization process, in accordance with one embodiment of the present invention. In block 802, a context to be applied in contextualization of one or more email message is identified. As described above, the context may be manually identified by a user, or automatically identified by semantic qualification logic 108, for example. At block 804, semantic qualification logic 108 proceeds to identify one or more elements contained within a given electronic mail message based at least in part upon the scope of the context. In one embodiment, semantic qualification logic 108 may use pattern matching techniques to identify whether the identified one or more elements correspond to one or more elements defined by the context. Thereafter, if the identified one or more elements are determined to correspond to one or more elements defined by the context, the identified one or more elements may be associated with one or more semantic qualifiers, block 806. In one embodiment, the semantic qualifiers to be associated with the identified one or more elements are defined by the context.

Weighted Valuation

In one embodiment of the invention, semantic qualification logic 108 may further operate to generate and/or assign one or more cost metrics for one or more electronic messages such as an email message. In one embodiment, cost metrics may be represented by metadata associated in one form or another with a corresponding electronic message. For example, as previously described, one or more metadata tags may be embedded in, or otherwise included with, an electronic message to indicate a cost metric associated with that message.

As used herein, the term "cost metric" is intended to broadly refer to some measure of cost that may be assigned to an electronic message, whether the cost represents a monetary value such as a rate, charge, expense, expenditure, or the cost represents a sacrifice or investment in time to an individual or entity for example. Moreover, the cost may be manually or automatically determined at a sending device, receiving device, or intermediate device, using either subjective or objective criteria. For example, one or more cost metrics may be assigned to an electronic message based upon the content of the message, efforts associated with composition of the message, or any post-processing required of the message (e.g., whether after transmission or receipt). In one embodiment, a cost metric may be assigned based upon the number of characters/keystrokes, words, or lines contained within an email message or the elapsed composition time associated with the message. Cost metrics may further be assigned based upon the complexity of a message or the occurrence or non-occurrence of one or more keywords within the electronic message.

In one embodiment, semantic qualification logic 108 may employ one or more contexts to facilitate the generation of cost metrics and assignment of the cost metrics to electronic messages. In one embodiment, an identified context may include published or private rate information for determining a cost metric for an electronic message and may, for example, be represented as a data dictionary, XML schema, a lookup table, and so forth. In one embodiment identified contexts may further represent rate dependencies and rule sets which may influence how one or more cost metrics may be calculated for a given message. Such contexts may be represented by in a variety of manners including but not limited to a scripting language such as JavaScript.

In one embodiment, determination of a cost metric for a given electronic message may be based upon the information included in or gathered in the generation of the electronic message.

Accordingly, a web service is envisioned whereby an individual such as a doctor may submit (e.g. using a messaging protocol such as SMTP or a web protocol such as HTTP) an electronic message to a third party such as a medical transcription or billing service. Upon receipt of the electronic message, an appropriate context for the message (e.g., medical transcription versus legal transcription) may be determined. As described above, the context may identify a set of keywords or key fields and corresponding values/rates that may be assigned to the electronic message if such keywords or key fields are identified as being part of the message. In the web service example, a published schema may indicate that all electronic mail messages containing a credit card number should be assigned a weight or value of 3 additional units. Furthermore, additional value or weight may be assigned to the electronic mail message based upon the type of credit card with which the number is associated. Once all the applicable weights/values have been determined for a given electronic message, one or more cost metrics may be determined and assigned to the message.

In one embodiment cost metrics are represented as metadata that is associated with a corresponding electronic messages. For example, one or more cost metrics may be included as part of an HTTP POST or GET method, or as metadata in an SMTP based mail message header.

Figure 12:
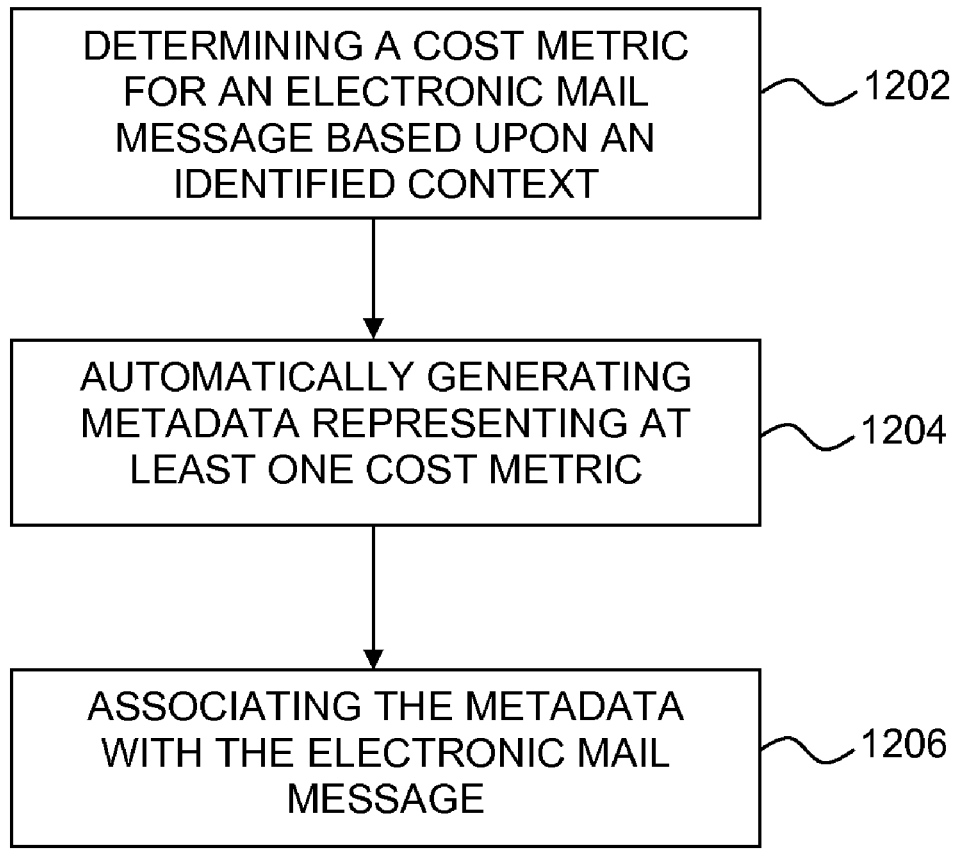
FIG. 12 is an operational flow diagram illustrating a method for assigning a cost metric to an electronic message in accordance with one embodiment of the present invention.

FIG. 12 is an operational flow diagram illustrating a method for assigning a cost metric to an electronic message such as an email message in accordance with one embodiment of the present invention. At block 1202, a cost metric is determined for an electronic message based upon an identified context. At block 1204, metadata representing at least the cost metric is automatically generated, and at block 1206, the metadata is associated with the electronic message.

Example Messaging System

Figure 9:
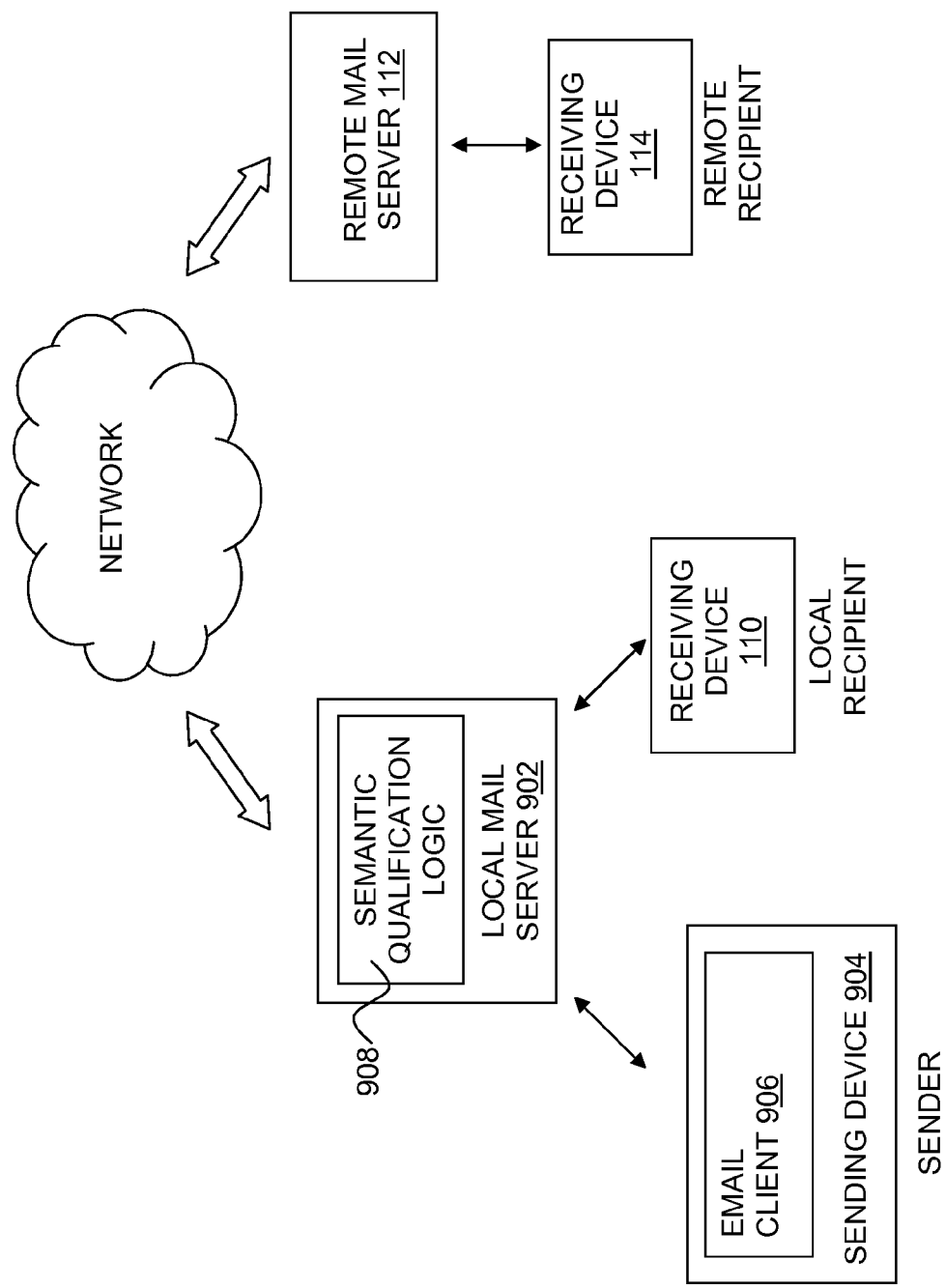
FIG. 9 illustrates an example network environment including local mail server 902 endowed with semantic qualification logic 908 to automatically contextualize email messages, in accordance with one embodiment of the invention.

FIG. 9 illustrates an example network environment including local mail server 902 endowed with semantic qualification logic 908 to automatically contextualize email messages, in accordance with one embodiment of the invention. In one embodiment, semantic qualification logic 908 automatically identifies content elements contained within email messages processed by local mail server 902 (e.g. both incoming and outgoing) based upon an identified context. For example, email messages processed by local mail server 902 may include email messages sent by sending device 904 using email client 906 and received by receiving device 110. Furthermore, semantic qualification logic 908 automatically associates one or more semantic qualifiers with the automatically identified content elements as determined by the identified context.

Example Client System

Figure 10:
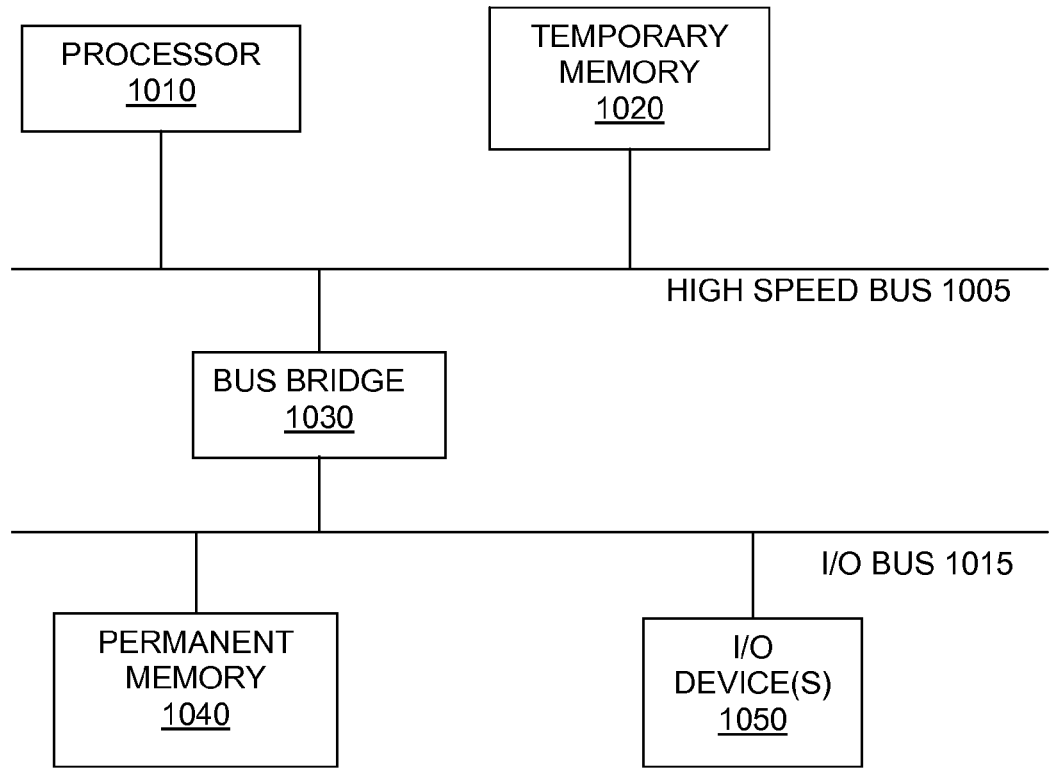
FIG. 10 illustrates one embodiment of a hardware system intended to represent a broad category of devices suitable for practicing the present invention.

FIG. 10 illustrates one embodiment of a hardware system intended to represent a broad category of devices (whether client or server based) such as personal computers, workstations, set-top boxes, wireless mobile phones, palm sized personal digital assistants, embedded systems, as well as other general purpose or dedicated messaging devices. In the illustrated embodiment, the hardware system includes processor 1010 coupled to high speed bus 1005, which is coupled to input/output (I/O) bus 1015 through bus bridge 1030. Temporary memory 1020 is coupled to bus 1005, whereas permanent memory 1040 is coupled to bus 1015. I/O device(s) 1050 is also coupled to bus 1015 and may include a display device, one or more user input devices such as a keyboard and mouse, one or more external network interfaces, etc.

Certain embodiments may include additional components, may require less than all of the above components, or may combine one or more of the above components together. For instance, temporary memory 1020 may be on-chip with processor 1010. Alternately, permanent memory 1040 may be eliminated and temporary memory 1020 may be replaced with an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Those skilled in the art will be familiar with a variety of alternate internal networks including, for instance, an internal network based on a high speed system bus with a memory controller hub and an I/O controller hub. Additional components may include additional processors, a CD ROM drive, additional memories, and other peripheral components known in the art.

In one embodiment, the present invention, as described above, is implemented using one or more hardware systems such as the hardware system of FIG. 10. Where more than one computer is used, the systems can be coupled to communicate over an external network, such as a local area network (LAN), an internet protocol (IP) network, etc. In one embodiment, the present invention is implemented as software routines executed by one or more execution units within the computer(s). For a given computer, the software routines can be stored on a storage device, such as permanent memory 1040.

Figure 11:
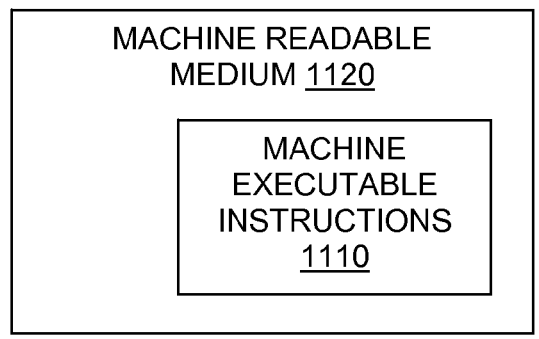
FIG. 11 illustrates one embodiment of a machine-readable medium.

Alternately, as shown in FIG. 11, the software routines can be machine executable instructions 1110 stored using any machine readable storage medium 1120, such as a diskette, CD-ROM, magnetic tape, digital video or versatile disk (DVD), laser disk, ROM, Flash memory, etc. The series of instructions need not be stored locally, and could be received from a remote storage device, such as a server on a network, a CD ROM device, a floppy disk, etc., through, for instance, I/O device(s) 1050 of FIG. 10.

From whatever source, the instructions may be copied from the storage device into temporary memory 1020 and then accessed and executed by processor 1010. In one implementation, these software routines are written in the C programming language. It is to be appreciated, however, that these routines may be implemented in any of a wide variety of programming languages.

In alternate embodiments, the present invention is implemented in discrete hardware or firmware. For example, one or more application specific integrated circuits (ASICs) could be programmed with one or more of the above-described functions of the embodiments of the present invention. In another example, one or more functions of the embodiments of the present invention could be implemented in one or more ASICs on additional circuit boards and the circuit boards could be inserted into the computer(s) described above. In another example, programmable gate arrays could be used to implement one or more functions of embodiments of the present invention. In yet another example, a combination of hardware and software could be used to implement one or more functions of the embodiments of the present invention.

Epilog

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A method comprising:
    receiving, by a computing device, an electronic mail message being sent from a clinical care provider to a recipient;
    processing, by the computing device, the electronic mail message to add one or more semantic qualifiers to contextualize the electronic mail message as being associated with a medical context, the medical context having a number of electronic mail content keywords or key fields associated with pre-determined rate information;
    generating, by the computing device, at least one quantitative cost metric value for the electronic mail message by applying the pre-determined rate information associated with the electronic mail content keywords or key fields of the medical context, based at least in part on one or more pieces of content contained in the electronic mail message;
    generating, by the computing device, metadata representing the at least one quantitative cost metric;
    associating, by the computing device, the metadata with the electronic mail message; and
    sending, by the computing device, the electronic mail message including the associated metadata.

2. The method of claim 1, further comprising transmitting, by the computing device, the at least one quantitative cost metric from the clinical care provider to a first address that is distinct from a second address to which the electronic mail message from the clinical care provider was sent.

3. The method of claim 1, wherein the pre-determined rate information is found in a published schema.

4. The method of claim 1, wherein the at least one quantitative cost metric further represents a quantity of time invested in the electronic mail message.

5. The method of claim 1, wherein applying the pre-determined rate information identified by the medical context to one or more pieces of content further comprises the computing device applying the pre-determined rate information to a total number of lines or words contained in the electronic mail message.

6. The method of claim 1, wherein the at least one quantitative cost metric represents a monetary value associated with composition of the electronic mail message.

7. The method of claim 1, wherein the at least one quantitative cost metric represents a monetary value associated with post-processing at least a portion of the electronic mail message.

8. A non-transitory machine readable storage medium comprising a plurality of instructions stored thereon, which, in response to execution by a processor of a computing device, cause the computing device to perform operations including:
    receiving an electronic mail message being sent from a clinical care provider to a recipient;
    processing the electronic mail message to add one or more semantic qualifiers to contextualize the electronic mail message as being associated with a medical context, the medical context having a number of electronic mail content keywords or key fields associated with pre-determined rate information;
    generating at least one quantitative cost metric value for the electronic mail message by applying the pre-determined rate information associated with the electronic mail content keywords or key fields of the medical context, based at least in part on one or more or more pieces of content contained in the electronic mail message;
    generating metadata representing the at least one quantitative cost metric;
    associating the metadata with the electronic mail message; and
    sending the electronic mail message including the associated metadata.

9. The non-transitory machine readable storage medium of claim 8, wherein the pre-determined rate information is found in a published schema.

10. The non-transitory machine readable storage medium of claim 8, wherein the at least one quantitative cost metric further represents a monetary value associated with composition of the electronic mail message.

11. The non-transitory machine readable storage medium of claim 8, wherein the at least one quantitative cost metric further represents a monetary value associated with post-processing at least a portion of the electronic mail message.

12. The machine readable storage medium of claim 8, wherein the at least one quantitative cost metric further represents a quantity of time invested in the electronic mail message.

13. An apparatus comprising:
    a processor;
    a communications interface; and
    a memory device coupled to the processor and communications interface, the memory device having a plurality of instructions stored thereon, which, in response to execution by the processor, cause the processor to:
        receive an electronic mail message being sent from a clinical care provider to a recipient;
        process the electronic mail message to add one or more semantic qualifiers to contextualize the electronic mail message as being associated with a medical context, the medical context having a number of electronic mail content keywords or key fields identifying pre-determined rate information;
        apply the pre-determined rate information associated with the electronic mail content keywords or key fields of the medical context, based at least in part on one or more pieces of content contained in the electronic mail message, to generate at least one quantitative cost metric value for the electronic mail message;
        generate metadata representing the at least one quantitative cost metric;
        associate the metadata with the electronic mail message; and
        send the electronic mail message including the associated metadata.

14. The apparatus of claim 13, wherein the pre-determined rate information is found in a published schema.

15. The apparatus of claim 13, wherein the at least one quantitative cost metric further represents a monetary value associated with composition of the electronic mail message.

16. The apparatus of claim 13, wherein the at least one quantitative cost metric further represents a monetary value associated with post-processing at least a portion of the electronic mail message.

17. The apparatus of claim 13, wherein the at least one quantitative cost metric further represents a quantity of time invested in the electronic mail message.

18. A method comprising:
receiving, by a computer device, an electronic mail message being sent from a clinical care provider to a recipient, the electronic mail message being augmented with metadata including one or more semantic qualifiers added to the electronic mail message to associate the electronic mail message with a medical context having a number of electronic mail content keywords or key fields associated with pre-determined rate information;
analyzing the one or more semantic qualifiers, by the computing device, to determine that the electronic mail message is associated with the medical context;
generating, by the computing device, at least one quantitative cost metric value to be applied to the electronic mail message by applying the pre-determined rate information associated with the electronic mail content keywords or key fields of the medical context based at least in part on one or more pieces of content contained in the electronic mail message; and
sending, by the computing device, the electronic mail message and the at least one quantitative cost metric value to the recipient.

19. The method of claim 18, wherein the context comprises one of a data dictionary and a schema.

20. The method of claim 18, wherein determining that the electronic mail message is associated with the context comprises determining content contained in the electronic mail message.

21. The method of claim 18, wherein the at least one quantitative cost metric further represents a monetary value associated with the electronic mail message.

22. A non-transitory machine readable storage medium comprising a plurality of instructions stored thereon, which, in response to execution by a processor, cause the processor to perform operations including:
receiving an electronic mail message being sent from a clinical care provider to a recipient, the electronic mail message being augmented with metadata including one or more semantic qualifiers added to the electronic mail message to associate the electronic mail message with a medical context having a number of electronic mail content keywords or key fields associated with pre-determined rate information;
analyzing the one or more semantic qualifiers to determine that the electronic mail message is associated with the medical context;
generating at least one quantitative cost metric to be applied to the electronic mail message by applying the pre-determined rate information associated with the electronic mail content keywords or key fields of the medical context based at least in part on one or more pieces of content contained in the electronic mail message; and
sending the electronic mail message and the at least one quantitative cost metric value to the recipient.

23. The non-transitory machine readable storage medium of claim 22, wherein the context comprises one of a data dictionary and a schema.

24. The non-transitory machine readable storage medium of claim 22, wherein the at least one quantitative cost metric further represents a monetary value associated with the electronic mail message.

25. An apparatus comprising:
a processor;
a communications interface; and
a memory device coupled to the processor and communications interface, the memory device having a plurality of instructions stored thereon, which, in response to execution by the processor, cause the processor to:
receive an electronic mail message being sent from a clinical care provider to a recipient, the electronic mail message being augmented with metadata including one or more semantic qualifiers added to the electronic mail message to associate the electronic mail message with a medical context having a number of electronic mail content keywords or key fields associated with pre-determined rate information;
analyze the one or more semantic qualifiers to determine that the electronic mail message is associated with the medical context;
apply the pre-determined rate information associated with the electronic mail content keywords or key fields of the medical context based at least in part on one or more pieces of content contained in the electronic mail message to generate at least one quantitative cost metric to be applied to the email message; and
send the electronic mail message and the at least one quantitative cost metric value to the recipient.

26. The apparatus of claim 25, wherein the context comprises one of a data dictionary and a schema.

27. The apparatus of claim 25, wherein the at least one quantitative cost metric further represents a monetary value associated with the electronic mail message.

* * * * *

UNITED STATES PATENT AND TRADEMARK OFFICE
CERTIFICATE OF CORRECTION

PATENT NO. : 8,145,716 B2
APPLICATION NO. : 11/221591
DATED : March 27, 2012
INVENTOR(S) : Murali M. Karamchedu et al.

It is certified that error appears in the above-identified patent and that said Letters Patent is hereby corrected as shown below:

In the Claims

In claim 12, col. 12, line 31, "The machine readable storage medium of claim 8, …" should read – "The non-transitory machine readable storage medium of claim 8, …"

Signed and Sealed this
Sixth Day of May, 2014

Michelle K. Lee
*Deputy Director of the United States Patent and Trademark Office*